(12) United States Patent
Frazier et al.

(10) Patent No.: US 7,986,622 B2
(45) Date of Patent: Jul. 26, 2011

(54) METHOD AND SYSTEM FOR PHYSICAL LAYER AGGREGATION

(75) Inventors: Howard Frazier, Pleasanton, CA (US); Patricia Thaler, Carmichael, CA (US); Ali Ghiasi, Cupertino, CA (US); Howard Baumer, Laguna Hills, CA (US)

(73) Assignee: Broadcom Corporation, Irvine, CA (US)

(*) Notice: Subject to any disclaimer, the term of this patent is extended or adjusted under 35 U.S.C. 154(b) by 442 days.

(21) Appl. No.: 11/866,692

(22) Filed: Oct. 3, 2007

(65) Prior Publication Data

US 2008/0095189 A1  Apr. 24, 2008

Related U.S. Application Data

(60) Provisional application No. 60/862,742, filed on Oct. 24, 2006.

(51) Int. Cl.
| | |
|---|---|
| H04L 1/00 | (2006.01) |
| H04L 12/26 | (2006.01) |
| H04J 3/00 | (2006.01) |
| H04J 3/16 | (2006.01) |
| H04J 3/22 | (2006.01) |
| H04J 3/04 | (2006.01) |

(52) U.S. Cl. ............... 370/229; 370/237; 370/230.1; 370/231; 370/464; 370/471; 370/535

(58) Field of Classification Search .......... 370/229, 370/237, 230.1, 231, 464, 471, 535
See application file for complete search history.

(56) References Cited

U.S. PATENT DOCUMENTS

2008/0095189 A1 * 4/2008 Frazier et al. ............ 370/469

OTHER PUBLICATIONS

IEEE 802.3ad-2000, "Aggregation of Multiple Link Segments", 2000, IEEE, all pages (183 pages).*

* cited by examiner

Primary Examiner — Kwang B Yao
Assistant Examiner — Adam Duda
(74) Attorney, Agent, or Firm — McAndrews, Held & Malloy, Ltd.

(57) ABSTRACT

Aspects of a system for physical layer aggregation may include one or more switch ICs and/or physical (PHY) layer ICs that enable reception of data packets via a medium access control (MAC) layer protocol entity. Each of the received data packets may be fragmented into a plurality of fragment payloads. Each of the plurality of fragment payloads may be sent to a PHY layer protocol entity instance a physical layer protocol entity instance selected from a plurality of physical layer protocol entity instances.

33 Claims, 12 Drawing Sheets

METHOD AND SYSTEM FOR PHYSICAL LAYER AGGREGATION

CROSS-REFERENCE TO RELATED APPLICATIONS/INCORPORATION BY REFERENCE

This application makes reference to, claims priority to, and claims the benefit of U.S. Provisional Application Ser. No. 60/862,742, filed on Oct. 24, 2006, which is hereby incorporated herein by reference in its entirety.

FIELD OF THE INVENTION

Certain embodiments of the invention relate to communication networks. More specifically, certain embodiments of the invention relate to a method and system for physical layer aggregation.

BACKGROUND OF THE INVENTION

Computer networks comprise a plurality of interconnected networking devices, such as routers, switches and/or computers. The physical connection that allows one networking device to communicate with another networking device is referred to as a link. Links may utilize wired or wireless communication technologies. Data may be communicated between networking devices via the link in groups of binary bits referred to as packets. The rate at which networking devices may communicate data via a link is referred to as link speed.

The task of achieving increasing link speeds is one of the challenges in computer networking technology. Higher link speeds correspond to higher bandwidth and correspondingly higher data rates. In pursing the goal of higher data rates, network architects may face a number of constraints. Such higher, or "cutting edge", data rates often require components, such as integrated circuit (IC) devices, and interconnect, such as category 6 (Cat6) or Cat7 cabling, which are more expensive than equivalent, more commonly used hardware that may not be capable of achieving the higher data rates. Thus, economic considerations potentially represent one such constraint. Various limitations dictate a speed at which components may operate, and a speed at which data may be transferred by the components and/or via interconnect.

As link speeds increase, one operational objective of networking designers may be to incrementally control the bandwidth associated with a link so that bandwidth may be deployed within the network "on demand". The ability to adjust link bandwidth on demand is referred to as scalability. An objective of scalability is to enable adjustment of link bandwidth dynamically under software control, such as from an operations administration and maintenance (OAM) monitoring terminal.

Networks, which utilize cutting edge technologies, which enable the higher data rates are often used to transport data that have considerable value to the users of the networks, for example for exchange of financial data, or for exchange of large volumes of data between very expensive supercomputer systems. Thus, another potential operational objective is to have the ability to gradually decrease the link bandwidth in the presence of impairments that may occur on the link. This ability to operate the link at a reduced bandwidth, rather than to lose use of the link altogether, is referred to as resiliency.

One approach to overcoming some of the limitations described above is to create a logical high bandwidth link by simultaneously transmitting the data via a plurality of lower bandwidth physical links. This method is often referred to as aggregation. Aggregation creates associations between the logical physical link and a group of physical links. In theory, aggregation enables scalability by increasing logical link bandwidth by increasing the number of associated physical links. Thus, if each physical link has a bandwidth of 10 gigabits/second (Gb), a higher speed logical link may be created by transmitting data via two 10 Gb physical links. In theory, the bandwidth of this aggregated logical link would be 20 Gb.

Aggregation also enables resiliency through gradual decreasing of logical link bandwidth by decreasing the number of associated physical links. For example, a physical link, which experiences a failure, may be removed from association with the aggregated logical link while the remaining physical links maintain association with the logical link. Thus, in a logical link associated with two 10 Gb physical links, the logical link bandwidth may be gradually decreased by removing one of the physical links in the association.

Link aggregation is one existing method for aggregation. A specification for link aggregation may be found in IEEE standard 802.3ad (IEEE 802.3ad). The IEEE 802.3ad standard specifies a method for defining a single logical link by aggregating individual physical links, each operating at data rates of 10 megabits/second (Mb) to 100 Mb, for example. However, the IEEE 802.3ad link aggregation may impose limitations on how data may be distributed among the physical links associated with a single logical link. This limitation may be related to the method in which network devices communicate within the network.

When a network device A_ and network device B_ establish a communication for the purpose of exchanging data, the communication may be referred to as a "conversation". The conversation may be identified by a conversation identifier, for example, network device A_ may create a conversation identifier cid=1 for the conversation with B_. The conversation identifier enables network device A_ to establish and concurrently maintain other conversations in addition to the conversation cid=1 by establish distinct conversation identifiers for each conversation (for example cid=2, cid=3, . . . ).

One limitation in IEEE 802.3ad link aggregation is that packets containing data transmitted from a source network device (for example A_) to a destination network device (for example B_), associated with a given conversation (for example cid=1), may be required to be transmitted via a single physical link, PL1, even though the logical link, LL1, may comprise a group of physical links, PL1, PL2, PL3 and PL4, for example. In this case, the network device A_ may maintain 4 concurrent conversations (for example cid=1, cid=2, cid=3 and cid=4) with the network device B_, wherein in data associated with the conversation cid=1 may be communicated via link PL1, data associated with the conversation cid=2 may be communicated via the link PL2, data associated with the conversation cid=3 may be communicated via link PL3 and data associated with the conversation cid=4 may be communicated via link PL4. However, if the network devices A_ and B_ are engaged in a single conversation, for example the conversation cid=1, the data transfer rate between the network devices A_ and B_ may be limited by the bandwidth of link PL1. Thus, while the theoretical bandwidth of the link LL1 may be equal to the sum of bandwidths of the links PL1, PL2, PL3 and PL4, the IEEE 802.3ad link aggregation may limit the bandwidth available for a single conversation to the bandwidth of an individual link PL1, PL2, PL3 or PL4.

One potential reason for this limitation is that the IEEE 802.3ad standard may impose temporal ordering restrictions on packets transferred via the logical link. These temporal ordering restrictions mean that if the network device A_ transmits data in a sequence of packets P1, followed by P2, followed by P3 and followed by P4 during the course of a conversation, the packets must be received at the network device B_ in the order P1, followed by P2, followed by P3 and followed by P4. If the packets are transmitted via the same link PL1, temporal ordering may be preserved for packets transmitted from network device A_ to network device B_. However, if the packets are distributed among the links, for example packet P1 transmitted via link PL1, packet P2 transmitted via the link PL2, packet the P3 transmitted via the link PL3 and the packet P4 transmitted via the link PL4, the temporal ordering cannot be guaranteed. For example, the network device B_ may receive the packets in the following order: P1 via PL1, P3 via PL3, P2 via PL2 and P4 via PL4. Receipt of the packets in the before mentioned order may violate the temporal ordering restrictions which may be required for IEEE 802.3ad link aggregation.

Thus, IEEE 802.3ad link aggregation may not exhibit the property of scalability since adding additional physical links may not result in a linear increase of logical link bandwidth due to temporal ordering restrictions.

Within the protocol reference model (PRM) specified by the international organization for standardization (ISO), the IEEE 802.3ad link aggregation may be represented as a software entity, which is located in the data link layer (DLL) of the PRM. Expanding further upon the DLL, the IEEE 802.3ad software entity may be represented as a link aggregation sublayer. Relative to the link aggregation sublayer, the next higher layer protocol entity within the DLL may be a medium access control (MAC) client. Exemplary MAC clients may comprise a bridge relay entity, or a logical link control (LLC) layer entity. Also relative to the link aggregation sublayer, the next lower layer protocol entity within the DLL may be one or more instances of a MAC sublayer. There may be a single instance of the MAC sublayer for each distinct physical link within the networking device.

The link aggregation sublayer may comprise functionalities individually referred to as distributor and collector. The distributor function may operate within a source network device while the collector function may operate within a destination network device. The distributor may receive packets from the MAC client, select a MAC sublayer entity from among a group of MAC sublayer entities associated with a logical link, and send the packet to the selected MAC sublayer entity. The MAC sublayer entity may then cause the packet to be transmitted via the associated physical link to the destination network device. The IEEE 802.3ad standard may require that the distributor send packets associated with a given conversation to a specific MAC sublayer entity due to temporal ordering restrictions.

The collector function may receive packets from a MAC sublayer entity, Ml, among a group of MAC sublayer entities. The collector may send the packet to the MAC client. Each received packet may be associated with a conversation identifier, for example cid=1. Temporal ordering restrictions may require that each packet containing cid=1 be received at the collector via the MAC sublayer entity Ml.

Physical medium entity (PME) aggregation is another existing method for aggregation. A specification for PME aggregation may be found in IEEE standard 802.3ah (IEEE 802.3ah). The IEEE 802.3ah standard specifies a method for defining a single logical link by aggregating individual digital subscriber line (DSL) interface links. The IEEE 802.3ah standard may specify two interface links, which may be utilized for PME aggregation: 10PASS-TS, a 10 Mb interface and 2BASE-TL, a 2.5 Mb interface. For example, PME aggregation may enable defining a single logical link with a theoretical aggregate link bandwidth of 10 Mb by forming an association of four 2BASE-TL interface links.

Referring to the ISO PRM, the IEEE 802.3ah PME aggregation may be represented as a hardware entity, which is located in the physical (PHY) layer. Expanding further upon the PHY layer, the IEEE 802.3ah hardware entity may be represented as a PME aggregation sublayer. The PME aggregation sublayer may be located within the physical coding sublayer (PCS). Within the PCS, the next higher layer protocol entity relative to the PME aggregation sublayer may be the MAC-PHY rate matching sublayer. Relative to the PCS, the next higher layer protocol entity may be the MAC sublayer, and the next lower layer protocol entity may be the PME layer. Relative to the MAC sublayer, the next higher layer protocol entity may be the MAC client. Each instance of a PME may correspond to a physical interface link located within a networking device.

The PME aggregation sublayer, within the PCS sublayer, may interface with a plurality of PMEs. A single PME aggregation sublayer instance may correspond to a single logical link while the plurality of PMEs, which interface to the PME aggregation sublayer instance, may correspond to the interface links that are associated with the logical link. In this regard, the PME aggregation sublayer may enable a logical link, LL2, to comprise a group of interface links DL1, DL2, DL3 and DL4, for example. The theoretical bandwidth of the link LL2 may be equal to the sum of bandwidths of interface links DL1, DL2, DL3 and DL4.

Within a source networking device A_, the PME aggregation sublayer instance may enable data associated with a conversation between the networking devices A_ and B_ to be distributed among the group of interface links associated with a single logical link. The PME aggregation sublayer instance may receive packets sent from the MAC sublayer. The packets may contain data associated with the conversation between networking devices A_ and B_, for example. The PME aggregation sublayer may divide each packet into a plurality of fragments, and distribute the fragments among the PME layer entities such that the plurality of fragments is transmitted via a plurality of interface links selected from the group of interface links associated with the single logical link. For example, a packet may be divided into fragments F1, F2, F3 and F4, respectively, where F1 represents the first portion of the packet after removal of the preamble, F2 the second portion, F3 the third portion and F4 represents the last portion of the packet. A logical link LL2 may be formed by an association among the interface links DL1, DL2, DL3 and DL4. The corresponding PME entities may be PM1, PM2, PM3 and PM4, respectively. The PME aggregation sublayer may send fragment F1 to PM1, F2 to PM2, F3 to PM3 and F4 to PM4. Correspondingly, PM1 may send the fragment F1 via interface link DL1, PM2 may send the fragment F2 via DL2, PM3 may send F3 via DL3 and PM4 may send F4 via DL4.

Within the destination networking device B_, the PME aggregation sublayer instance may enable reception of the fragments F1, F2, F3 and F4 from a plurality of PMEs. The PME aggregation sublayer instance within B_ may not place restrictions on the order in which each of the fragments is received. The PME aggregation sublayer instance may rearrange the fragments in order F1, F2, F3 and F4 and assemble a received packet. A completed packet may be assembled by appending a preamble field to the assembled received packet. The preamble field appended by the PME aggregation sublayer instance within the destination networking device B_ may comprise a determined binary value, for example 10101010. The appended preamble field may not comprise the same binary value as did the preamble field removed by the PME aggregation sublayer instance within the source networking device A_. Thus, the source networking device A_ may not be able to utilize the preamble field to communicate information, such as OAM, to the destination networking device B_. The PME aggregation sublayer instance may send the completed packet to the MAC sublayer.

The PME aggregation sublayer instance directly receives packets from the MAC-PHY rate matching sublayer. An inter packet gap (IPG) is inserted between packets such that after the last bit from a current packet is received, a time delay as defined by the IPG will elapse before the PME aggregation sublayer instance receives the first bit from the next packet. The first portion of the packet may contain a preamble field. The preamble field may have a fixed length as measured in octets, for example 8 octets. The preamble field may be utilized for synchronization, or for other purposes, such as to communicate OAM information between communicating network devices.

At the source networking device, the PME aggregation sublayer instance removes the preamble field and copies a first portion of the packet following the preamble field as a first fragment payload, FP1. The fragment payload may have a length specified from within a range of values from 64 octets to 512 octets. The PME aggregation sublayer instance may append a first fragment header FH1 to the fragment payload FP1. The fragment header may have a specified length, for example 2 octets. A frame check sequence (FCS) may be computed and appended to FP1 as a first FCS, FCS1. The collection of fields, FH1, FP1 and FCS1 form a first fragment F1. The FCS is utilized at the destination networking device to enable detection and/or correction of bit errors in a received fragment.

The PME aggregation sublayer instance copies a second portion of the packet following the portion copied for FP1. The second portion becomes a second fragment payload, FP2. A second fragment F2 is generated by appending a fragment header FH2, and frame check sequence FCS2 to FP2. The PME aggregation sublayer may continue copying subsequent portions of the packet until the last portion has been copied. After the last portion of the packet, FPN, has been copied a last fragment, FN, may be generated. At this point, the packet has been fragmented.

The frame header field for each fragment, FH, contains a sequence number, SN, a start of packet (SOP) field and an end of packet (EOP) field. The SN field may be 14 bits in length, for example. The value contained in the SN field may be incremented for each subsequent fragment that is generated within the PME aggregation sublayer. For example, SN=1 for F1, SN=2 for F2, . . . . The SN field enables the PME aggregation sublayer instance within the destination networking device to identify an order in which fragments were sent by the source networking device. The field SOP=1 for the first fragment generated from a received packet, for example F1. For fragments other than the first fragment, SOP=0. The field EOP=1 for the last fragment generated from a received packet, for example FN. For fragments other than the last fragment, EOP=0.

The SOP and EOP field enable the PME aggregation sublayer instance within the destination networking device to identify which block of fragments are associated with the same packet. For example, when the destination PME aggregation sublayer instance receives a fragment for which the fragment header fields are: SN=i, SOF=1 and EOF=0, a first fragment may be identified. Thus, a fragment for which the fragment header fields are: SN=i+1, SOF=0 and EOF=0 identifies a second fragment with at least one additional fragment to follow. A fragment for which the fragment header fields are: SN=i+2, SOF=0 and EOF=1 identifies a third and last fragment associated with a packet.

The IEEE 802.3ad link aggregation defines a link aggregation sublayer that is located within the DLL in the ISO PRM. The IEEE 802.3ad link aggregation may impose temporal ordering restrictions, which may limit scalability properties of link aggregation. The IEEE 802.3ah PME aggregation defines a PME aggregation sublayer, which is located within the PHY layer in the ISO PRM. Relative to the PME aggregation sublayer, the next higher and next lower protocol layer entities may each be located within the PHY layer.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for physical layer aggregation, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for physical layer aggregation. Various embodiments of the invention may comprise an aggregation at the physical layer (APL) protocol entity, which may be located within the data link layer (DLL) or in the physical (PHY) layer. An instance of the APL protocol entity may receive packets, each of which may contain a preamble field and a frame start delimiter (FSD) field. The APL protocol entity instance may segment the contents of each packet into a plurality of fragment payload fields. For each fragment payload field, a fragment header field may be generated. For each fragment header field, a cyclical redundancy check (CRC) field may be generated. The CRC field may enable detection and/or correction of binary errors in the corresponding fragment header field. A corresponding plurality of fragments may be generated by appending the corresponding fragment header and CRC fields to each fragment payload field.

Various embodiments of the invention may enable the deployment of scalable and resilient network architectures. The plurality of fragments may be sent from a source APL protocol entity instance in a source networking device to a destination APL protocol entity instance in a destination networking device via a plurality of physical links, which may be associated with a logical link. As the destination APL protocol entity instance receives each fragment, the CRC field in the received fragment may be inspected to detect and/or correct binary errors in the fragment header field. The destination APL protocol entity instance may also reorder received fragments based on the fragment header field to match the order in which the fragments were sent by the source APL protocol entity instance. After receiving each of the fragments, the destination APL protocol entity instance may assemble the received fragments to generate a packet.

Figure 1:
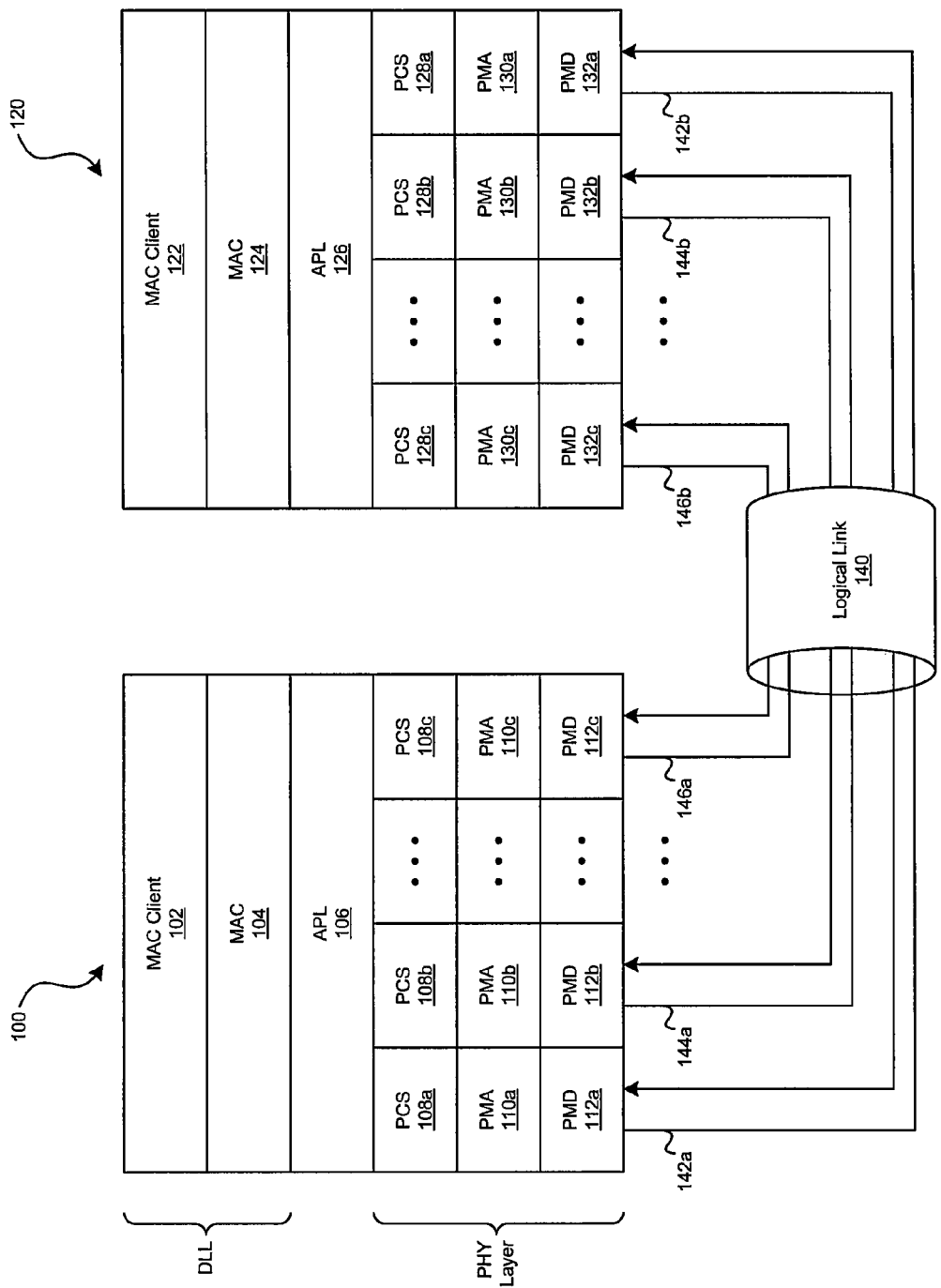
FIG. 1 is a diagram that illustrates an exemplary protocol stack for physical layer aggregation, in accordance with an embodiment of the invention.

FIG. 1 is a diagram that illustrates an exemplary protocol stack for physical layer aggregation, in accordance with an embodiment of the invention. Referring to FIG. 1, there is shown a networking device 100, a networking device 120, a logical link 140, and a plurality of physical links 142a, 142b, 144a, 144b, . . . , 146a and 146b. The networking device 100 may comprise a protocol stack, which includes a MAC client entity 102, a MAC entity 104, an APL entity 106, a plurality of PCS entities 108a, 108b, . . . , 108c, a plurality of physical medium attachment (PMA) entities 110a, 110b, . . . , 110c, and a plurality of physical medium dependent (PMD) entities 112a, 112b, . . . , 112c. The networking device 120 may comprise a protocol stack, which may comprise a MAC client entity 122, a MAC entity 124, an APL entity 126, a plurality of PCS entities 128a, 128b, . . . , 128c, a PMA entities 130a, 130b, . . . , 130c, and a plurality of PMD entities 132a, 132b, . . . , 132c.

The networking devices 100 and 120 may be communicatively coupled via a plurality of physical links. FIG. 1 illustrates an exemplary full duplex coupling in which physical links 142a, 144a, . . . , and 146a enable networking device 100 to communicate data to networking device 120, while physical links 142b, 144b, . . . , and 146b enable networking device 120 to communicate data to networking device 100. The plurality of physical links 142a, 142b, 144a, 144b, . . . , 146a and 146b may be associated with a logical link 140.

The MAC client 102 may represent a protocol entity that may either comprise a logical link control (LLC) entity, or a bridge entity, for example. A description of the LLC entity may be specified in IEEE 802.2 standards. A description of the bridge entity may be specified in IEEE 802.1 standards. The MAC client 102 may be implemented in software, firmware and/or hardware.

The MAC entity 104 may represent a protocol entity that controls access by the networking device 100 to the physical links 142a, 142b, 144a, 144b, . . . , 146a and 146b. A description of the MAC entity 104 may be specified in IEEE 802.3 standards. Two functions performed within the MAC entity 104 may include data encapsulation and medium access control. Within a source networking device, data encapsulation may comprise a set of functions that receive data to be communicated via a network, and assembles a packet by appending header fields and/or trailer fields to the data. The packet may then be transported from a source networking device to a destination networking device via the network. Within a destination networking device, data encapsulation may comprise a set of functions that receive a packet via a network, and extract the data by parsing the packet to remove header fields and/or trailer fields. The medium access control entity 104 may comprise a set of functions that enable initiation of transmission of packets via the network and/or recovery from transmission failures, such as when a packet transmitted from the source networking device is not successfully received by the destination networking device.

The PCS entity may represent a protocol entity, which in a source networking device, receives packets from a higher layer protocol entity and provides logic for encoding binary data contained in packets to line code for transmission via a physical link. An exemplary encoding method is 64B/66B encoding, in which 64 bits of data may be transformed to a 66 bit line code. The line code may be serialized. The PCS entity may send the line code to a lower layer protocol entity. In a destination networking device, the PCS entity may receive line code from a lower layer protocol entity and decode the line code to generate a packet containing data. The PCS entity may send the decoded packet to the higher layer protocol entity.

Within the protocol stack shown within the networking device 100, there may be a plurality of PCS instances corresponding to a plurality of physical links. For example, the PCS instance PCS 108a may be associated with the physical links 142a and 142b, the PCS instance PCS 108b may be associated with the physical links 144a and 144b and the PCS instance PCS 108c may be associated with the physical links 146a and 146b.

The PMA entity may represent a protocol entity, which in a source networking device, receives line code from a higher layer protocol entity and provides logic performing physical medium dependent coding of the received line codes. The PMA entity may generate code representations of the received line codes, which may be utilized for generating signals that may be transmitted via a physical link. The PMA entity may receive line code and generate, for example, a non-return to zero (NRZ) representation for each received line code bit. The PMA entity may also generate signal timing information. The PMA entity may send the code representations and signal timing information to a lower layer protocol entity. In a destination networking device, the PMA entity may receive code representations from a lower layer protocol entity and convert the code representations, which may be based on a specific physical medium type, to line code bits, for which the representations may be independent of a specific physical medium type. The destination PMA entity may recover signal timing information received from the received code representations, which may be utilized during the line code generation process. The destination PMA entity may send the line code to a higher layer protocol entity.

Within the protocol stack shown within the networking device 100, there may be a plurality of PMA instances corresponding to a plurality of physical links. For example, the PMA instance PMA 110a may be associated with the physical links 142a and 142b, the PMA instance PMA 110b may be associated with the physical links 144a and 144b and the PMA instance PMA 110c may be associated with the physical links 146a and 146b.

The PMD entity may represent a protocol entity, which in a source networking device, receives code representations from a higher layer protocol entity and provides logic for generating signals that may be transmitted via a physical link. The PMD entity may receive code representations and generate signals comprising voltage levels when the physical link transmits electrical signals, or the PMD entity may generate signals comprising one or more optical wavelengths when the physical link transmits optical signals. The PMD entity may send the signals to a physical link. In a destination networking device, the PMA entity may receive electrical and/or optical signals from a physical link and convert the signals to code representations. The destination PMA entity may send the code representations to a higher layer protocol entity.

Within the protocol stack shown within the networking device 100, there may be a plurality of PMD instances corresponding to a plurality of physical links. For example, the PMD instance PMD 112a may be associated with the physical links 142a and 142b, the PMD instance PMD 112b may be associated with the physical links 144a and 144b and the PMD instance PMD 112c may be associated with the physical links 146a and 146b.

The physical links 142a, 142b, 144a, 144b, . . . , 146a and 146b may comprise a variety of physical medium types, such as optical fiber or copper. Examples of physical link types may include 10GBASE-SR, 10GBASE-LRM, 10GBASE-LR, 10GBASE-ER, 10GBASE-ZR, 10GBASE-LX4, 10GBASE-CX4, 10GBASE-KX, 10GBASE-KR and 10GBASE-T, for example.

The MAC client 102 and MAC 104 protocol entities may comprise functionality, which may correspond to the DLL in the ISO PRM. The PCS, PMA and PMD protocol entities may comprise functionality, which may correspond to the PHY layer in the ISO PRM.

The APL 106 may represent a protocol entity, which may be located between the DLL and the PHY layer in a protocol stack. The APL 106 may provide functionality, which in a source networking device, enables a packet to be received from a higher layer protocol entity. In various embodiments of the invention, the higher layer protocol entity may be located within the DLL in a protocol stack. Within a source networking device, the APL 106 may generate a plurality of fragment payloads, wherein each fragment payload comprises a portion of the data contained in the received packet. The APL 106 may then generate a fragment header for each of the fragment payloads. Each fragment header may comprise a sequence number and an indication of whether the associated fragment payload comprises a first portion of a packet, last portion of a packet, or neither. In various embodiments of the invention, the fragment comprising the first portion of the packet may also contain at least a portion of a preamble when the packet contains a preamble. The binary value of the preamble contained in one of more fragments may be equal to the binary value of the preamble contained in the associated packet. Thus, in various embodiments of the invention, the preamble field from the packet may not be discarded when generating fragments. The APL 106 may generate a CRC for each fragment header. The APL 106 may then generate a plurality of fragments by appending to each fragment payload a corresponding fragment header and corresponding CRC. The plurality of fragments may be distributed among a plurality of lower layer protocol instances. In various embodiments of the invention, each of the lower layer protocol instances may be located within the PHY layer in a protocol stack.

Within a destination networking device, the APL 106 may receive a plurality of fragment payloads from a plurality of lower layer protocol instances. In various embodiments of the invention, each of the lower layer protocol instances may be located within the PHY layer. Upon receiving each fragment, the APL 106 may inspect the CRC field to detect and/or correct bit errors in the fragment header. The APL 106 may inspect the fragment header to determine which portion of a received packet is contained within the fragment payload. Based on the fragment headers, the APL 106 may determine that each of the fragments contained within a packet has been received when it, for example, receives: i) a fragment with a fragment number, <F1>, which may comprise an indication that the fragment contains a first portion of a packet; ii) a fragment with a fragment number, <FM>, which may comprise an indication that the fragment contains a last portion of the packet; and iii) each of the fragments <F1+1>, <F1+2>, . . . , and <FM−1>. Upon receipt of the group of fragments, the APL 106 may assemble a received packet. The APL 106 may receive fragments in an arbitrary order and rearrange the order of received fragments based on the contents of the fragment header. The APL 106 may extract the fragment payloads from the rearranged fragments and assemble a received packet. The received packet may then be sent to a higher layer protocol entity. In various embodiments of the invention, the higher layer protocol entity may be located within the MAC layer.

The MAC client 122 may be substantially similar to the MAC client 102. The MAC 124 may be substantially similar to the MAC 104. The APL 126 may be substantially similar to the APL 106. The PCS 128a, 128b, . . . , 128c may be substantially similar to the PCS 108a. The PMA 130a, 130b, . . . , 130c may be substantially similar to the PMA 110a. The PMD 132a, 132b, . . . , 132c may be substantially similar to the PMD 112a.

In operation, the networking device 100 may be a source networking device in engaged in a single conversation with the networking device 120, which may be a destination networking device. As the networking device 100 may send data to the networking device 120. The networking device 100 may utilize the logical link 140 to communicate with the networking device 120. Within the logical link 140, the networking device 100 may utilize physical links 142a, 144a, . . . , and 146a to communicate data to the networking device 120.

Within the networking device 100, the MAC client 102 may send a packet P1 to the MAC 104. The MAC 104 may send the packet P1 to the APL 106. The APL 106 may copy portions of the packet P1 into fragment payloads. A fragment payload FP1 may comprise a first portion of data contained in the packet P1. The fragment payload PF1 may comprise a preamble field when the packet P1 contains a preamble. The binary value of the preamble field copied into the fragment payload FPR may be equal to the binary value of the preamble field contained in the payload P1. A fragment payload FP2 may comprise a second portion of data contained in the packet P1. A fragment payload FP3 may comprise a third portion of the data contained in the packet P1 and FPM may comprise a final portion of the data contained in the packet P1.

The APL 106 may generate a fragment header for each of the fragment payloads. The first fragment header, FH1 may comprise a sequence number <F1> associated with the fragment payload FP1 and an indication that the fragment payload comprises the first portion of the packet P1. The APL 106 may generate a CRC field, CRC1, based on the fragment header FH1. The CRC field, CRC1, may be computed based on the binary data contained in the fragment header FH1 by utilizing any of a plurality of CRC generator polynomials. A first fragment F1 may be generated by combining FH1, CRC1 and FP1.

The APL 106 may also generate fragment headers for fragment payloads FP2, FP3, ..., and FPM. The fragment header for FP2, FH2, may comprise a sequence number <F1+1> and an indication that the fragment payload FP2 contains neither a first or last portion of the packet P1. A CRC field, CRC2, may also be generated for FH2. A second fragment F2 may be generated by combining FH2, CRC2 and FP2. The fragment header for FP3, FH3, may comprise a sequence number <F1+2> and an indication that the fragment payload FP3 contains neither a first or last portion of the packet P1. A CRC field, CRC3, may also be generated for FH3. A third fragment F3 may be generated by combining FH3, CRC3 and FP3. The fragment header for FPM, FHM, may comprise a sequence number <FM> and an indication that the fragment payload FPM contains a last portion of the packet P1. A CRC field, CRCM, may also be generated for FHM. A last fragment FM may be generated by combining FHM, CRCM and FPM.

The APL 106 may distribute the fragments among a plurality of PCS instances in the group PCS 108*a*, 108*b*, ..., and 108*c*. The PCS 108*a* may enable data to be transmitted via the physical link 142*a*, the PCS 108*b* may enable data to be transmitted via the physical link 144*a* and the PCS 108*c* may enable data to be transmitted via the physical link 146*a*. By distributing the fragments among the PCS 108*a*, 108*b*, ..., and 108*c*, the APL 106 may be able to exploit scalability properties available in the logical link 140 for transmission of data associated with a single conversation. In addition, the APL 106 may be enabled to support resiliency properties available in the logical link 140 by utilizing physical links, which are in an operational, non-failed state. The APL 106 may utilize a variety of criteria in selecting which PCS instances are to receive which fragments. In an exemplary embodiment of the invention, the APL 106 may utilize a round robin method. In various other exemplary embodiments of the invention, the APL 106 may utilize a load balancing method, which may attempt to make equal and/or unequal utilization of physical links associated with a logical link 140.

In an exemplary embodiment of the invention in which there may be a plurality of N PCS instances, the APL 106 may send fragment F1 to PCS 108*a*, fragment F2 to PCS 108*b*, ..., fragment FN to PCS 108*c*, fragment FN+1 to PCS 108*a*, fragment FN+2 to PCS 108*b*, ..., fragment FM-(N−1) to PCS 108*a*, fragment FM-(N−2) to PCS 108*b*, ..., and fragment FM to PCS 108*c*. The PCS 108*a* may encode each received fragment and send the encoded fragments to the PMA 110*a*. The PCS 108*a* may send the encoded fragments to the PMA 110*a* bit serially. The PMA 110*a* may convert the bits in each encoded fragment to a NRZ representation and send the NRZ encoded fragments to the PMD 112*a*. The PMD 112*a* may generate signals based on the NRZ encoded fragments and transmit the signals via the physical link 142*a*.

The PCS 108*b*, the PMA 110*b* and the PMD 112*b* may operate substantially similar to the PCS 108*a*, the PMA 110*a* and the PMD 112*a*. The PMD 112*b* may transmit signals via the physical link 144*a*. The PCS 108*c*, PMA 110*c* and PMD 112*c* may operate substantially similar to PCS 108*a*, the PMA 110*a* and the PMD 112*a*. The PMD 112*c* may transmit signals via the physical link 146*a*.

Within the networking device 120, the PMD 132*a* may receive signals via the physical link 142*a*. The PMD 132*a* may convert the signals to an NRZ encoded representation and send the NRZ encoded bits to the PMA 130*a*. The NRZ encoded bits may be sent to the PMA 130*a* bit serially. The PMA 130*a* may convert the NRZ encoded bit to line coded bits. The PMA 130*a* may send the line coded bits to the PCS 128*a*. The line coded bits may be sent to the PCS 128*a* bit serially. The PCS 128*a* may collect the line coded bits and convert the line coded bits to binary data bits. The PCS 128*a* may assemble data bits to generate a received fragment, for example received fragment F1'. The received fragment F1' may be sent to the APL 126.

The APL 126 may receive the fragment F1' and inspect the CRC field, CRC1'. Based on the binary data contained in the received fragment header FH1' and the received CRC field CRC', the APL 126 may detect and/or correct bit errors in the received fragment header FH1'. After verifying the integrity of the fragment header, the APL 126 may inspect the contents of the fragment header FH1' to determine the sequence number and to determine which the corresponding fragment payload FP1' may contain a first portion of the packet P1, last portion, or neither. In this exemplary instance, the fragment header FH1' may contain a sequence number <F1> and an indication that the fragment payload FP1' may contain the first portion of the packet P1. The fragment payload FP1' may contain a preamble field. The binary value of the preamble field contained in the fragment payload FP1' may be equal to the binary value of the preamble field in the packet P1. The APL 126 may store the received fragment F1' pending receipt of additional fragments.

The PMD 132*a*, PMA 130*a* and PCS 128*a* may receive additional signals via the physical link 142*a* and generate subsequent fragments, which may be sent to the APL 126. In addition, the PMD 132*b*, PMA 130*b* and PCS 128*b* may operate substantially similar to PMD 132*a*, PMA 130*a* and PCS 128*a*. The PMD 132*b* may receive signals via the physical link 144*a*. The PMD 132*c*, PMA 130*c* and PCS 128*c* may operate substantially similar to PMD 132*a*, PMA 130*a* and PCS 128*a*. The PMD 132*c* may receive signals via the physical link 146*a*.

The APL 126 may determine when it has received each of the fragments associated with the packet P1 as set forth above. The APL 126 may assemble the received fragments to generate a received packet P1' as set forth above. The received packet P1' may be sent to the MAC 124. The MAC 124 may send the received packet to the MAC client 122.

In various embodiments of the invention, the APL 106 may receive and/or send packets from and/or to the MAC 104. Thus, to the MAC 104, the interface to the APL 106 may be substantially similar to the interface between the MAC 104 and a PHY layer protocol entity. The APL 106 may distribute and/or receive each of a plurality of generated fragments to and/or from the lower layer protocol instances as though the fragments were packets. Thus, to a PHY layer protocol instance such as the PCS 108*a*, the interface to the APL 106 may be substantially similar to the interface between the PHY layer protocol instance and the MAC 104. A preamble field in the packet P1 generated by the networking device 100 may be communicated to the networking device 120 via a preamble field in the received packet P1'. Thus, in various embodiments of the invention, the preamble field may be utilized to communicate information, for example OAM, from a source networking device to a destination networking device.

In various embodiments of the invention, the maximum size of an individual fragment payload, as measured in octets, may be configurable. For example, the maximum size of the individual fragment payload may be 16 octets, and the maximum size of the individual fragment payload may be 32 octets. The size of a fragment header, as measured in bits, may also be configurable, and the fragment payload size and/or fragment header size may be determined based on policy objectives. For example, the size of the fragment header may be 14 bits, and the fragment header size and/or fragment payload size may be determined based on overhead considerations, wherein shorter fragment headers and longer fragment payload may result in reduced overhead. Alternatively, longer fragment headers may allow greater skew tolerance, where skew may be a measure of the difference in the propagation delay of the physical links. Other policy objectives may include latency targets, and buffering requirements.

Figure 2:
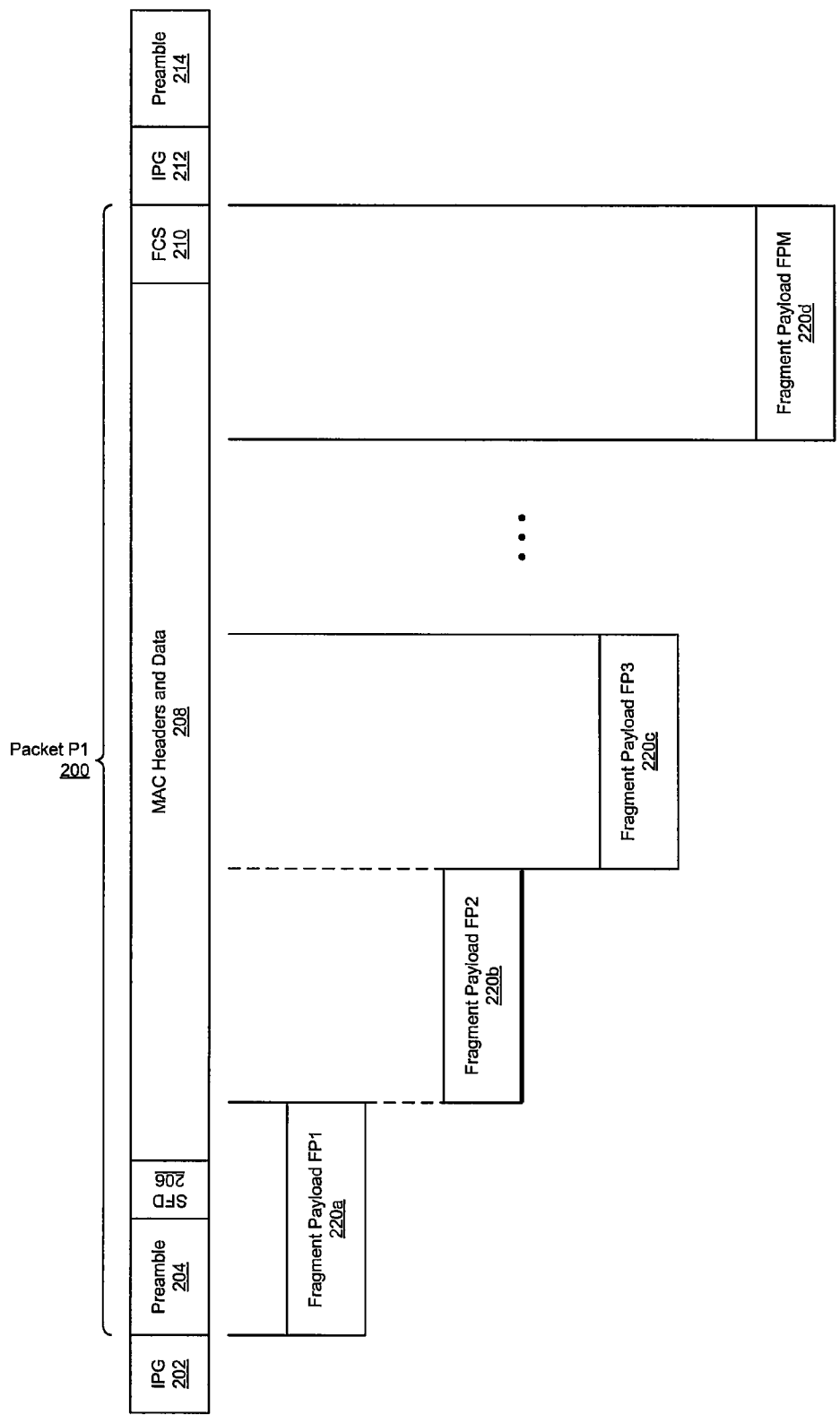
FIG. 2 is a diagram of exemplary packet fragmentation, in accordance with an embodiment of the invention.

FIG. 2 is a diagram of exemplary packet fragmentation, in accordance with an embodiment of the invention. Referring to FIG. 2, there is shown a packet 200, inter packet gap (IPG) fields 202 and 212 and preamble field 214. An example of the packet 200 may be the packet P1 reference in FIG. 1. The packet 200 may comprise a preamble field 204, a start of frame delimiter (SFD) 206, MAC headers and data 208, and a frame check sequence (FCS) field 210. The preamble field 204 may comprise a determined value, for example, an alternating 10 bit pattern, or the preamble field 204 may comprise data, for example OAM data, which is being communicated between a source networking device and a destination networking device.

The SFD 206 may comprise a binary value, which may indicate the beginning of the MAC headers and data field 208. The MAC headers and data field 208 may comprise an address for the source networking device and/or destination networking device and data which is being communicated between the two networking devices. The FCS 210 may be computed based on the MAC headers and data field 208 and may enable detection and correction of bit errors in the MAC headers and data field 208. The IPG 202 and 212 may precede and follow the packet 200. The IPG 202 may refer to a time interval between the end of transmission of a previous packet, and the beginning of transmission of the packet 200. The IPG 212 may refer to a time interval between the end of transmission of the packet 200, and the beginning of transmission of a succeeding packet. The preamble 214 may be a field contained within the succeeding packet.

Also shown in FIG. 2 is an exemplary segmentation of the data contained in the packet 200 into fragment payloads 220a, 220b, 220c . . . , and 220d. The fragment payload 220a may comprise a first portion of the packet 200. The fragment payload 220a may comprise the preamble field 204 from the packet 200. An exemplary fragment payload 220a may be the fragment payload FP1 described in FIG. 1. The fragment payload 220b may comprise a second portion of the packet 200. An exemplary fragment payload 220b may be the fragment payload FP2 described in FIG. 1. The fragment payload 220c may comprise a third portion of the packet 200. An exemplary fragment payload 220c may be the fragment payload FP3 described in FIG. 1. The fragment payload 220d may comprise a last portion of the packet 200. An exemplary fragment payload 220d may be the fragment payload FPM described in FIG. 1.

Figure 3:
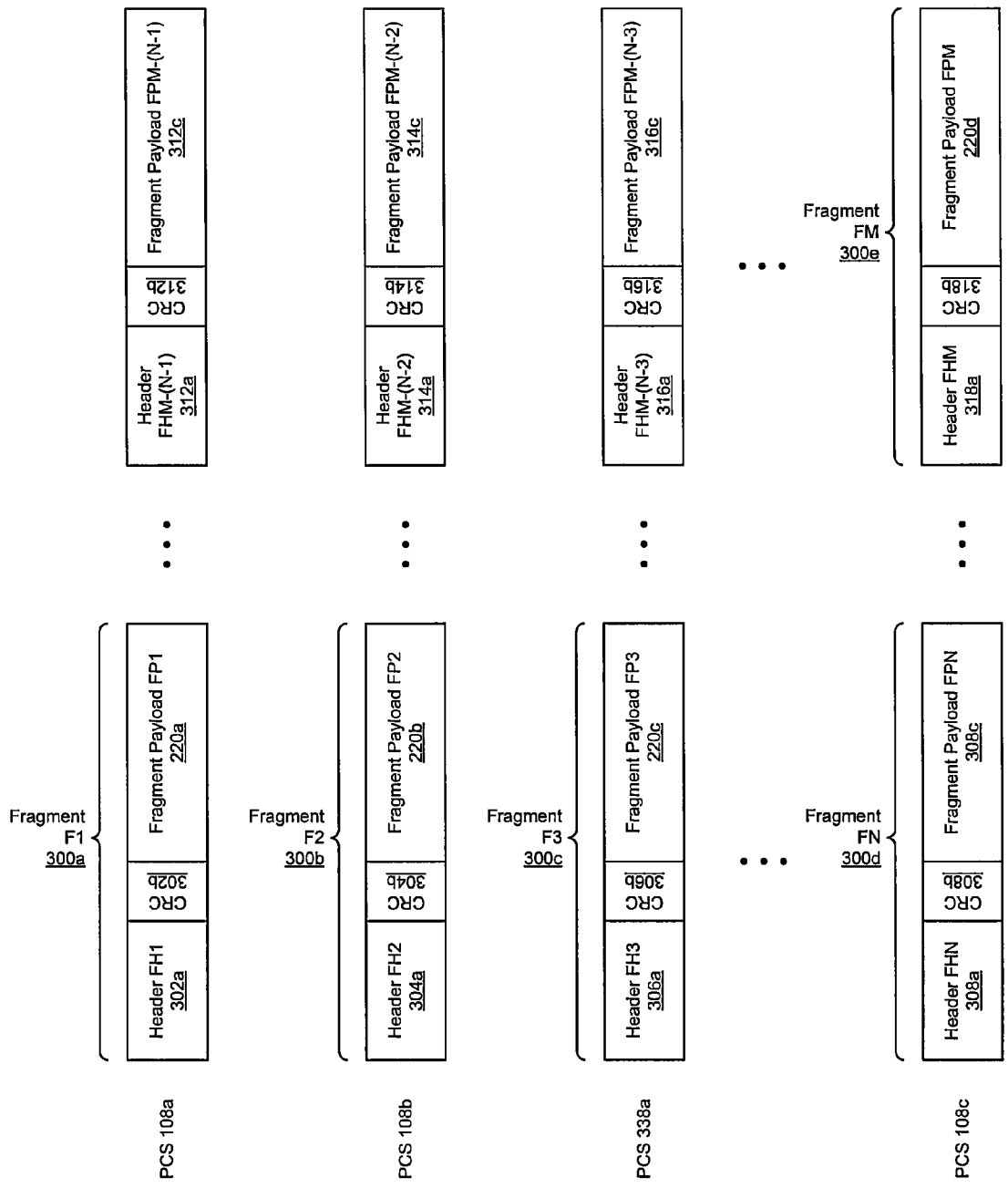
FIG. 3 is a diagram illustrating an exemplary distribution of fragments among a plurality of physical coding sublayer entities, in accordance with an embodiment of the invention.

FIG. 3 is a diagram illustrating an exemplary distribution of fragments among a plurality of physical coding sublayer entities, in accordance with an embodiment of the invention. Referring to FIG. 3, there is shown a plurality of fragments 300a, 300b, 300c, . . . , 300d, . . . , and 300e. Also shown is a plurality of fragment headers 302a, 304a, 306a, . . . , 308a, . . . , 312a, 314a, 316a, . . . , and 318a, a plurality of CRC fields 302b, 304b, 306b, . . . , 308b, . . . , 312b, 314b, 316b, . . . , and 318b. Also shown is a plurality of fragment payloads 220a, 220b, 220c, . . . , 308c, . . . , 312c, 314c, 316c, . . . , and 220d.

The APL 106 may generate fragment 300a by combining fragment header 302a, CRC 302b and fragment payload 220a. An exemplary fragment 300a may be fragment F1 described in FIG. 1. An exemplary fragment header 302a may be fragment header FH1 described in FIG. 1. An exemplary CRC field 302b may be CRC1 described in FIG. 1.

The APL 106 may generate fragment 300b by combining fragment header 304a, CRC 304b and fragment payload 220b. An exemplary fragment 300b may be fragment F2 described in FIG. 1. An exemplary fragment header 304a may be fragment header FH2 described in FIG. 1. An exemplary CRC field 304b may be CRC2 described in FIG. 1.

The APL 106 may generate fragment 300c by combining fragment header 306a, CRC 306b and fragment payload 220c. An exemplary fragment 300c may be fragment F3 described in FIG. 1. An exemplary fragment header 306a may be fragment header FH3 described in FIG. 1. An exemplary CRC field 306b may be CRC3 described in FIG. 1.

The APL 106 may generate fragment 300d by combining fragment header 308a, CRC 308b and fragment payload 308c. An exemplary fragment 300d may be fragment FN described in FIG. 1. The APL 106 may generate fragment 300e by combining fragment header 318a, CRC 318b and fragment payload 220d. An exemplary fragment 300e may be fragment FM described in FIG. 1.

Additional fragments may be generated, for example, a fragment may comprise fragment header 312a, CRC field 312b, and fragment payload 312c, another fragment may comprise fragment header 314a, CRC field 314b, and fragment payload 314c and another fragment may comprise fragment header 316a, CRC field 316b, and fragment payload 316c.

In an exemplary embodiment of the invention, the APL 106 may send fragment 300a to PCS 108a, fragment 300b to PCS 108b, fragment 300c to a PCS 338a, and fragments 300d and 300e to PCS 108c.

Figure 4:
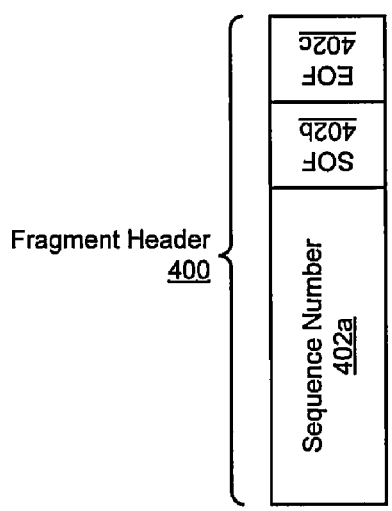
FIG. 4 is a diagram of an exemplary fragment header for physical layer aggregation, in accordance with an embodiment of the invention.

FIG. 4 is a diagram of an exemplary fragment header for physical layer aggregation, in accordance with an embodiment of the invention. Referring to FIG. 4, there is shown a fragment header 400. The fragment header 400 may comprise a sequence number field 402a, a start of frame (SOF) field 402b and an end of frame (SOF) field 402c. An exemplary fragment header 400 may comprise fragment header FH1 described in FIG. 1. An exemplary sequence number field 402a may be the sequence number <F1> described in FIG. 1. The SOF field 402b may comprise an indication, SOF=1, that the associated fragment payload contains the first fragment in a packet. A value SOF=0 may indicate that the associated fragment payload may not contain the first fragment in the packet. The EOF field 402c may comprise an indication, EOF=1, that the associated fragment payload contains the last fragment in a packet. A value EOF=0 may indicate that the associated fragment payload may not contain the last fragment in the packet.

Figure 5:
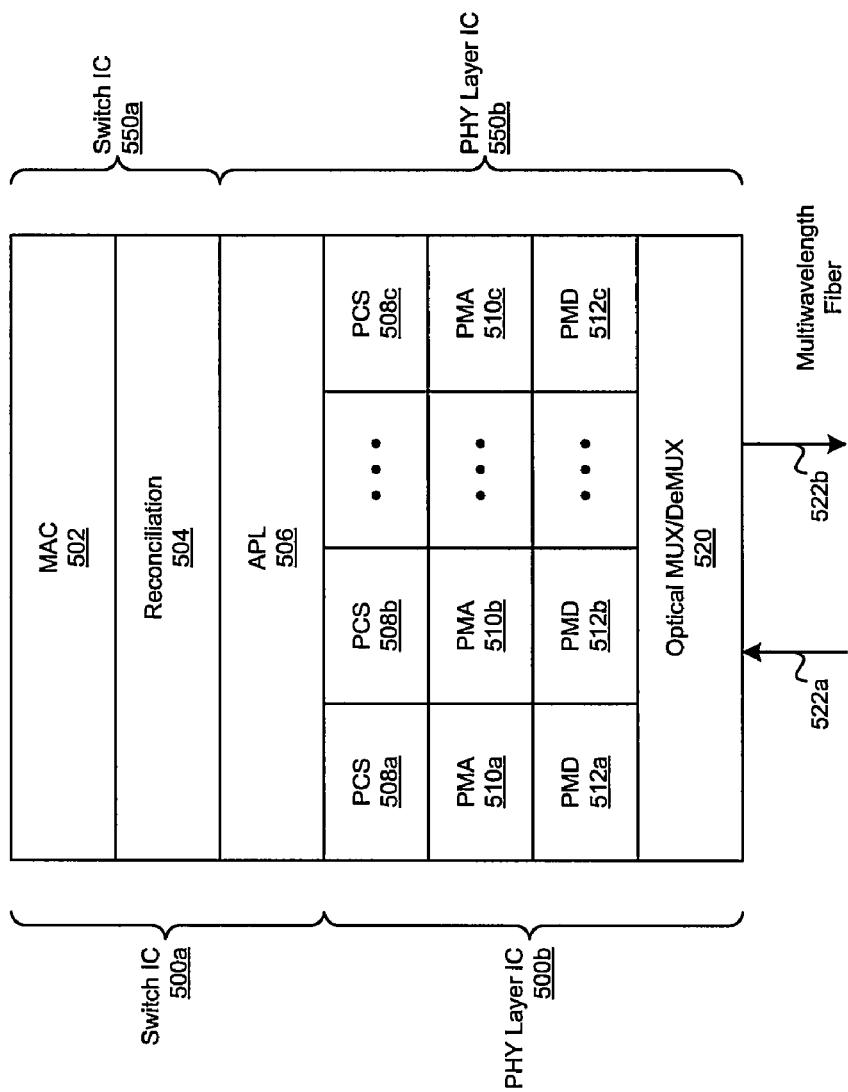
FIG. 5 is a diagram of exemplary integrated circuit chip sets for physical layer aggregation, in accordance with an embodiment of the invention.

FIG. 5 is a diagram of exemplary integrated circuit chip sets for physical layer aggregation, in accordance with an embodiment of the invention. Referring to FIG. 5, there is shown a switch integrated circuit (IC) chip 500a, a PHY layer IC chip 500b, a switch IC chip 550a, a PHY layer IC chip 500b, and a plurality of optical fibers 522a and 522b. The switch IC chips 500a and 550a may enable DLL related switching functions, such as bridging. The PHY layer IC chips 500b and 550b may enable PHY layer related functions, such as transmitting and/or receiving signals via one or more physical links. The optical fibers 522a and/or 522b may be multi-wavelength fibers, which may be utilized for wide wavelength division multiplexing (WWDM), for example.

The switch IC chip 500a may comprise a MAC 502, a reconciliation sublayer 504, an APL 506. The reconciliation sublayer 504 may represent a protocol entity, which may provide a logical interface between the MAC 502 and the APL 506.

The PHY layer IC chip 500b may comprise one or more PCS instances 508a, 508b, ..., and 508c, one or more PMA instances 510a, 510b, ..., and 510c, one or more PMD instances 512a, 512b, ..., and 512c, and an optical multiplexer and demultiplexer (MUX/DeMUX) 520. In a source networking device, the optical MUX/DeMUX 520 may interface with a plurality of PMD instances 512a, 512b, ..., and 512c, wherein each PMD instance may generate optical signals of different wavelengths. The optical MUX/DeMUX may combine the optical signals to generate a composite optical signal comprising a plurality of different wavelengths. The composite optical signal may then be transmitted via the optical fiber 522b. In a destination networking device, the optical MUX/DeMUX 520 may receive a composite optical signal via the optical fiber 522a. The optical MUX/DeMUX 520 may filter the composite optical signal to generate a plurality of optical signals, wherein each optical signal may comprise distinct wavelengths. The optical MUX/DeMUX 520 may send each of the plurality of generated optical signals to a PMD instance selected from the plurality of PMD instances 512a, 512b, ..., and 512c.

In operation, a single switch IC chip 500a may be communicatively coupled to one or more PHY layer IC chips 500b. Similarly, a single switch IC chip 550a may be communicatively coupled to one or more PHY layer IC chips 550b.

As may be seen in FIG. 5, the location of the APL 506 may allow flexibility when implementing protocol stacks in IC chips. In an exemplary embodiment of the invention, the APL 506 may be located within the switch IC chip 500a. In another exemplary embodiment of the invention, the APL 506 may be located within the PHY layer IC chip 550b.

Figure 6:
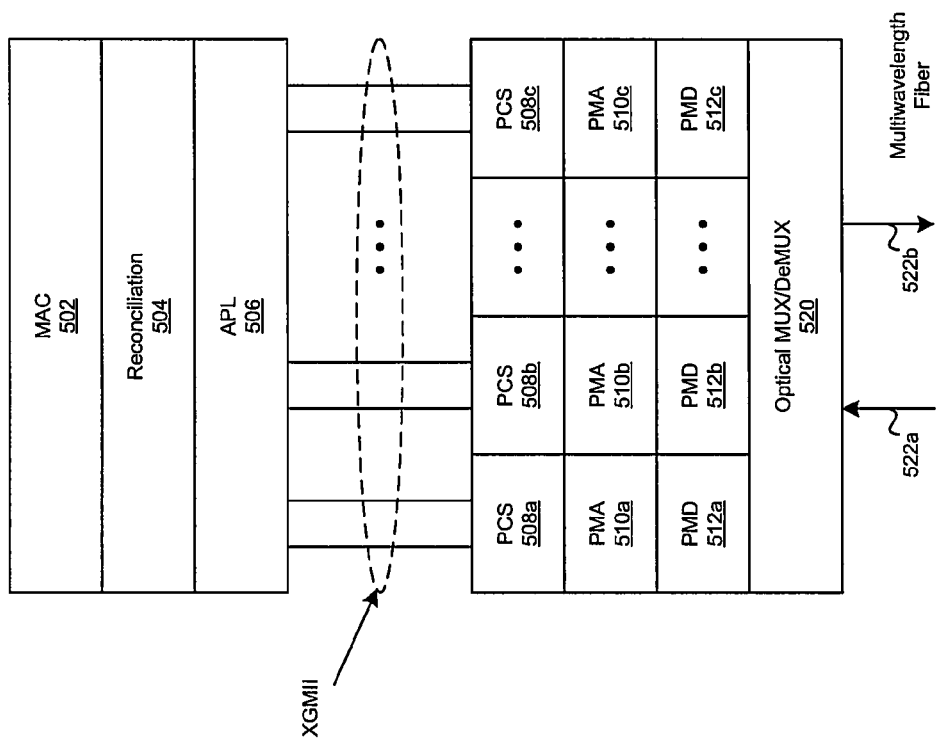
FIG. 6 is a diagram of an exemplary protocol stack for physical layer aggregation using an XGMII, in accordance with an embodiment of the invention.

FIG. 6 is a diagram of an exemplary protocol stack for physical layer aggregation using an XGMII, in accordance with an embodiment of the invention. Referring to FIG. 6, there is shown a MAC 502, reconciliation sublayer 504, APL 506, a plurality of PCS instances 508a, 508b, ..., and 508c, a plurality of PMA instances 510a, 510b, ..., and 510c, a plurality of PMD instances 512a, 512b, ..., and 512c, an optical MUX/DeMUX 520, and a plurality of optical fibers 522a and 522b.

As shown in FIG. 6, the APL 506 may be utilized in conjunction with the 10G media independent interface (XGMII). As shown in FIG. 6, the XGMII may provide an interface between the APL 506 and each PCS instance 508a, 508b, ..., and 508c. Thus, in various embodiments of the invention the APL 506 may be utilized with 10G Ethernet protocol stacks, which utilize the XGMII.

Figure 7:
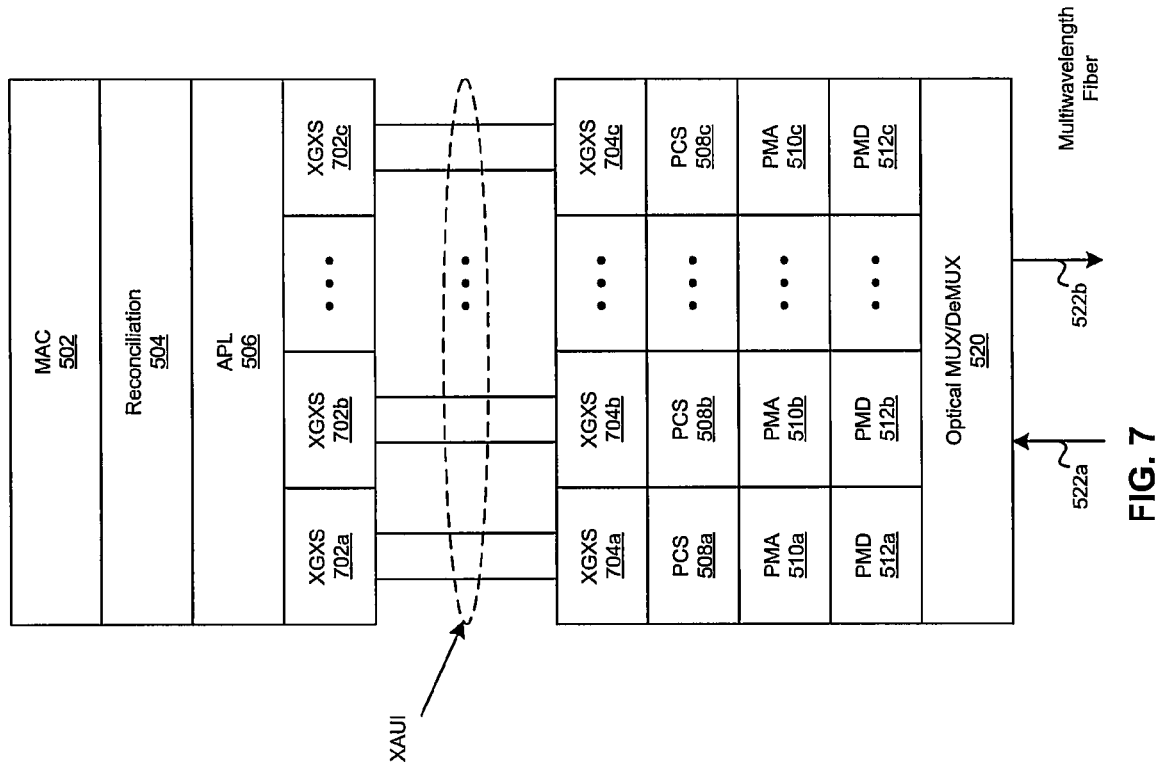
FIG. 7 is a diagram of an exemplary protocol stack for physical layer aggregation using an XAUI, in accordance with an embodiment of the invention.

FIG. 7 is a diagram of an exemplary protocol stack for physical layer aggregation using an XAUI, in accordance with an embodiment of the invention. Referring to FIG. 7, there is shown a MAC 502, reconciliation sublayer 504, APL 506, a plurality of XGMII extender sublayer (XGXS) instances 702a, 702b, ..., and 702c, and 704a, 704b, ..., and 704c, a plurality of PCS instances 508a, 508b, ..., and 508c, a plurality of PMA instances 510a, 510b, ..., and 510c, a plurality of PMD instances 512a, 512b, ..., and 512c, an optical MUX/DeMUX 520, and a plurality of optical fibers 522a and 522b.

As shown in FIG. 7, the APL 506 may be utilized in conjunction with the 10G extended attachment unit interface (XAUI). As shown in FIG. 7, the APL 506 may interface with XGXS instance 702a, 702b, ..., and 702c. The XAUI may interface with each XGXS instance 702a, 702b, ..., and 702c, and each corresponding XGXS instance 704a, 704b, ..., and 704c. Each XGXS instance 704a, 704b, ..., and 704c may interface with each corresponding PCS instance 508a, 508b, ..., and 508c. Thus, in various embodiments of the invention the APL 506 may be utilized with 10G Ethernet protocol stacks, which utilize the XAUI.

Figure 8:
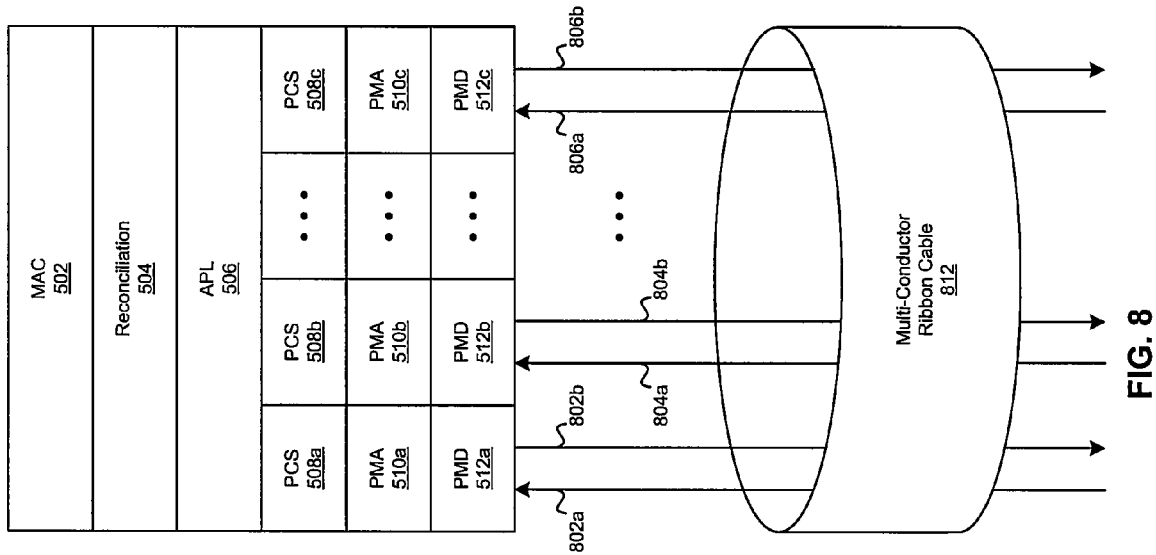
FIG. 8 is a diagram of an exemplary protocol stack for physical layer aggregation with multi-conductor ribbon cable, in accordance with an embodiment of the invention.

FIG. 8 is a diagram of an exemplary protocol stack for physical layer aggregation with multi-conductor ribbon cable, in accordance with an embodiment of the invention. Referring to FIG. 8, there is shown a MAC 502, reconciliation sublayer 504, APL 506, a plurality of PCS instances 508a, 508b, ..., and 508c, a plurality of PMA instances 510a, 510b, ..., and 510c, a plurality of PMD instances 512a, 512b, ..., and 512c, and a plurality of physical links 802a, 802b, 804a, 804b, ..., 806a and 806b.

FIG. 8 illustrates an exemplary embodiment of the invention in which the physical links may be contained in a multi-conductor ribbon cable. In various embodiments of the invention, the plurality of physical links 802a, 802b, 804a, 804b, ..., 806a and 806b may be contained within a multi-conductor ribbon cable 812.

Figure 9:
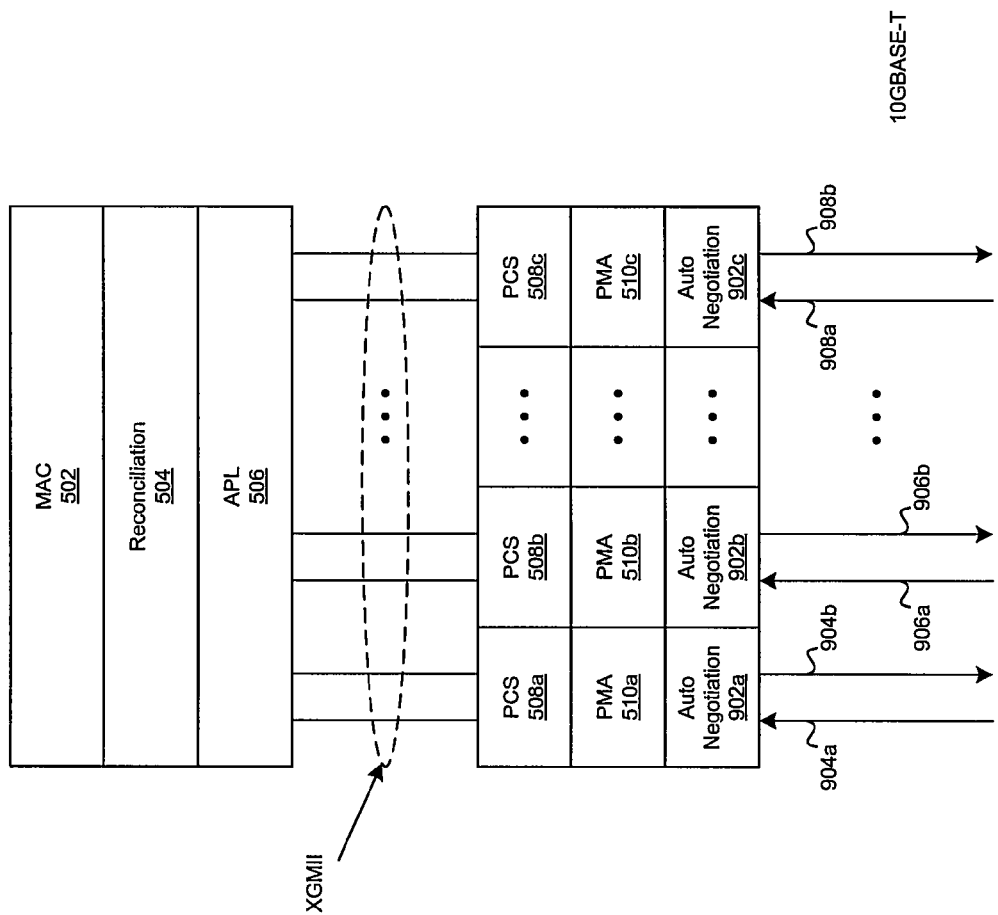
FIG. 9 is a diagram of an exemplary protocol stack for physical layer aggregation using an XGMII with 10GBase-T, in accordance with an embodiment of the invention.

FIG. 9 is a diagram of an exemplary protocol stack for physical layer aggregation using an XGMII with 10GBase-T, in accordance with an embodiment of the invention. Referring to FIG. 9, there is shown a MAC 502, reconciliation sublayer 504, APL 506, a plurality of PCS instances 508a, 508b, ..., and 508c, a plurality of PMA instances 510a, 510b, ..., and 510c, a plurality of auto negotiation instances 902a, 902b, ..., and 902c, and a plurality of physical links 904a, 904b, 906a, 906b, ..., 908a and 908b. As shown in FIG. 9, the XGMII may provide an interface between the APL 506 and each PCS instance 508a, 508b, ..., and 508c. The physical links 904a, 904b, 906a, 906b, ..., 908a and 908b may comprise shielded and/or unshielded twisted pair cables. Each auto negotiation instance 902a, 902b, ..., and 902c may enable a source networking device to negotiate with a peer auto negotiation instance in a destination networking device to determine capabilities, such as data transfer rate, for communication via the connecting physical links.

Figure 10:
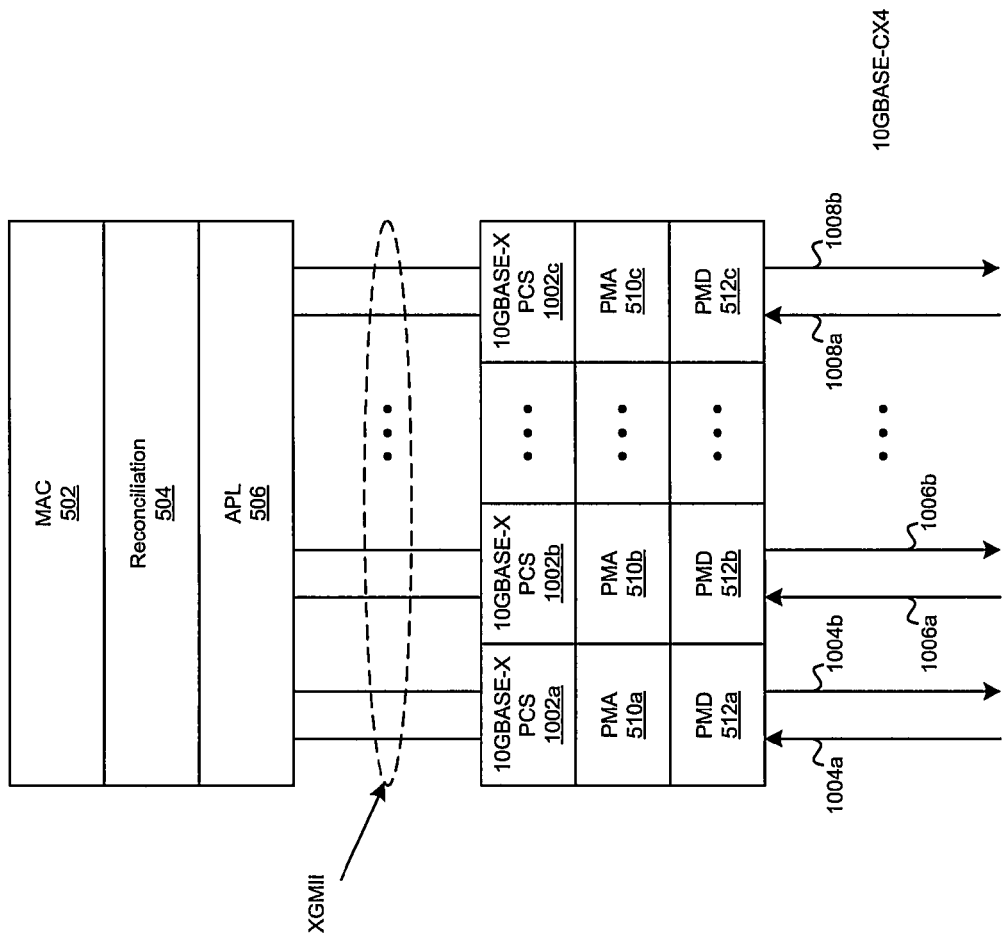
FIG. 10 is a diagram of an exemplary protocol stack for physical layer aggregation using an XGMII with 10GBase-CX4, in accordance with an embodiment of the invention.

FIG. 10 is a diagram of an exemplary protocol stack for physical layer aggregation using an XGMII with 10GBase-CX4, in accordance with an embodiment of the invention. Referring to FIG. 10, there is shown a MAC 502, reconciliation sublayer 504, APL 506, a plurality of 10GBASE-X PCS instances 1002a, 1002b, ..., and 1002c, a plurality of PMA instances 510a, 510b, ..., and 510c, a plurality of PMD instances 512a, 512b, ..., and 512c, and a plurality of physical links 1004a, 1004b, 1006a, 1006b, ..., 1008a and 1008b. As shown in FIG. 10, the XGMII may provide an interface between the APL 506 and each 10GBASE-X PCS instance 1002a, 1002b, ..., and 1002c. The physical links 1004a, 1004b, 1006a, 1006b, ..., 1008a and 1008b may comprise InfiniBand cables, for example. Each 10GBASE-X PCS instance 1002a, 1002b, ..., and 1002c may enable a binary data to line code encoding and/or decoding suitable for 10GBASE-CX4 physical links.

Figure 11:
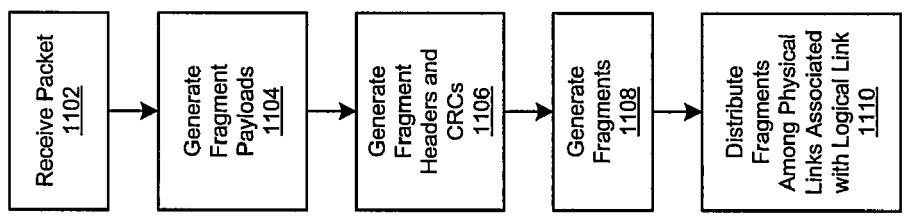
FIG. 11 is a flowchart illustrating exemplary steps for transmitting packets for physical layer aggregation, in accordance with an embodiment of the invention.

FIG. 11 is a flowchart illustrating exemplary steps for transmitting packets for physical layer aggregation, in accordance with an embodiment of the invention. Referring to FIG. 11, in step 1102, the APL layer 106 may receive a packet from a DLL protocol entity, for example, from the MAC layer 104. In step 1104, the APL 106 may generate a plurality of fragment payloads. In step 1106, the APL 106 may generate a corresponding plurality of fragment headers. A CRC field may be generated corresponding to each fragment header. In step 1108, the APL 106 may combine corresponding fragment headers, CRC fields, and fragment payloads to generate a plurality of fragments. In step 1110, the APL 1110 may distribute the fragments to a plurality of PHY layer protocol instances (for example, the plurality of PCS instances 108a, 108b, ..., and 108c) such that the fragments may be transmitted via a plurality of physical links 142a, 144a, ..., and 146a associated with a logical link 140.

Figure 12:
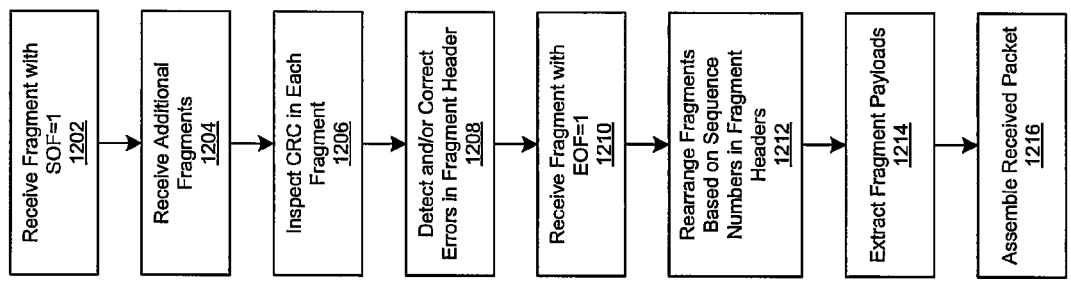
FIG. 12 is a flowchart illustrating exemplary steps for receiving fragments for physical layer aggregation, in accordance with an embodiment of the invention.

FIG. 12 is a flowchart illustrating exemplary steps for receiving fragments for physical layer aggregation, in accordance with an embodiment of the invention. Referring to FIG. 12, in step 1202, the APL 126 may receive a first fragment associated with a packet. The first fragment may be identified by the SOF=1 field in the fragment header. In step 1204, the APL 126 may receive additional fragments associated with the packet. The APL 126 may receive fragments one or more PHY layer protocol instances, for example, via the plurality of PCS instances 128a, 128b, ..., and 128c. In step 1206, the APL 126 may inspect the CRC field in each received fragment. In step 1208, the APL 126 may detect and/or correct binary errors in the corresponding fragment header field. In step 1210, the APL 126 may receive a last fragment associated with the packet. The last fragment may be identified by the EOF=1 field in the fragment header. In step 1212, the APL 126 may determine that each fragment associated with the packet has been received based on the sequence number fields in each of the received fragments. While the APL 126 may not receive the fragments in the order that they may have been transmitted by the APL 106, the APL 126 may utilize the sequence numbers in the received fragments to rearrange the fragments to reflect the order in which they were transmitted by the APL 106. In step 1214, the APL 126 may extract the fragment payloads from each of the reordered fragments. In step 1216, the APL 126 may assemble a received packet based on the fragment payloads. The APL 126 may send the assembled packet to a DLL protocol entity, for example, to the MAC 124.

Aspects of a system for physical layer aggregation may include one or more switch ICs 500a and/or physical (PHY) layer ICs 550b that enable reception of data packets via a medium access control (MAC) layer protocol entity. Each of the received data packets may be fragmented into a plurality of fragment payloads. Each of the plurality of fragment payloads may be sent to a PHY layer protocol entity instance a physical layer protocol entity instance selected from a plurality of physical layer protocol entity instances. The plurality of fragment payloads may be transmitted via a plurality of physical links corresponding to at least a portion of the plurality of physical layer protocol entity instances. The plurality of physical links may be associated with a single logical link. A fragment header may be generated for each of the plurality of fragment payloads. The fragment header may contain a sequence number. The fragment header may contain an indication that the corresponding fragment payload contains a first fragment or last fragment from the received data packet. An error check field may be generated based on the fragment header. A fragment may be generated by combining a fragment header, error check field and corresponding fragment payload. Each fragment payload may be encapsulated in a fragment when sending the fragment payload to a PHY layer protocol instance.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication in a data communication system, the method comprising:
receiving data packets at an aggregation at the physical layer (APL) protocol entity residing between a medium access control (MAC) layer protocol entity and a plurality of physical (PHY) layer protocol entity instances, wherein at least one of said data packets comprises a preamble;
fragmenting, by said APL protocol entity, each of said received data packets into a plurality of fragment payloads wherein at least one of said plurality of fragment payloads comprises at least a portion of said preamble; and
sending each of said plurality of fragment payloads to a physical (PHY) layer protocol entity instance selected from said plurality of physical layer protocol entity instances.

2. The method according to claim 1, comprising transmitting said plurality of fragment payloads via a plurality of physical links corresponding to at least a portion of said plurality of physical layer protocol entity instances.

3. The method according to claim 2, wherein said plurality of physical links is associated with a single logical link.

4. The method according to claim 1, comprising generating a fragment header corresponding to each of said plurality of fragment payloads.

5. The method according to claim 4, comprising generating a sequence number within each said generated fragment header.

6. The method according to claim 4, comprising generating an indication within said generated fragment header when said each of said plurality of fragment payloads comprises a first fragment from said each of said received data packets.

7. The method according to claim 4, comprising generating an indication within said generated fragment header when said each of said plurality of fragment payloads comprises a last fragment from said each of said received data packets.

8. The method according to claim 4, comprising generating an error check field based on said generated fragment header.

9. The method according to claim 8, comprising generating a fragment by combining said generated fragment header, said generated error check field and said corresponding each of said plurality of fragment payloads.

10. The method according to claim 9, comprising encapsulating said each of said plurality of fragment payloads in a corresponding said fragment when sending said each of said plurality of fragment payloads to said physical layer protocol instance.

11. The method according to claim 1, comprising receiving each of said data packets at said aggregation at the physical layer (APL) protocol entity via said MAC layer protocol entity.

12. The method according to claim 11, comprising fragmenting each of said received data packets at said APL protocol entity.

13. The method according to claim 11, comprising sending each of said plurality of fragment payloads from said APL protocol entity to a physical coding sublayer (PCS) instance within said physical layer protocol entity.

14. A computer system having stored thereon, a computer program having at least one code section being executable to perform steps comprising:
receiving data packets at an aggregation at the physical layer (APL) protocol entity residing between a medium access control (MAC) layer protocol entity and a plurality of physical (PHY) layer protocol entity instances, wherein at least one of said data packets comprises a preamble;
fragmenting, by said APL protocol entity, each of said received data packets into a plurality of fragment payloads wherein at least one of said plurality of fragment payloads comprises at least a portion of said preamble; and
sending each of said plurality of fragment payloads to a physical layer protocol entity instance selected from said plurality of physical layer protocol entity instances.

15. The computer system according to claim 14, wherein said at least one code section comprises code for transmitting said plurality of fragment payloads via a plurality of physical links corresponding to at least a portion of said plurality of physical layer protocol entity instances.

16. The computer system according to claim 15, wherein said plurality of physical links is associated with a single logical link.

17. The computer system according to claim 14, wherein said at least one code section comprises code for generating a fragment header corresponding to each of said plurality of fragment payloads.

18. The computer system according to claim 17, wherein said at least one code section comprises code for generating a sequence number within each said generated fragment header.

19. The computer system according to claim 17, wherein said at least one code section comprises code for generating an indication within said generated fragment header when said each of said plurality of fragment payloads comprises a first fragment from said each of said received data packets.

20. The computer system according to claim 17, wherein said at least one code section comprises code for generating an indication within said generated fragment header when said each of said plurality of fragment payloads comprises a last fragment from said each of said received data packets.

21. The computer system according to claim 17, wherein said at least one code section comprises code for generating an error check field based on said generated fragment header.

22. The computer system according to claim 21, wherein said at least one code section comprises code for generating a fragment by combining said generated fragment header, said generated error check field and said corresponding each of said plurality of fragment payloads.

23. The computer system according to claim 22, wherein said at least one code section comprises code for encapsulating said each of said plurality of fragment payloads in a corresponding said fragment when sending said each of said plurality of fragment payloads to said physical layer protocol instance.

24. A system for communication in a data communication system, the system comprising:
one or more circuits comprising at least a switch IC and a physical (PHY) layer IC, wherein:
a medium access control (MAC) layer protocol entity, a plurality of physical (PHY) layer entity instances, and an aggregation at the physical layer (APL) protocol entity are implemented in said one or more circuits;
said APL protocol entity resides between said MAC layer protocol entity and said plurality of PHY layer protocol entities; and
said one or more circuits enable:
reception of data packets at said APL protocol entity, wherein at least one of said data packets comprises a preamble;
fragmentation by said APL protocol entity of each of said received data packets into a plurality of fragment payloads wherein at least one of said plurality of fragment payloads comprises at least a portion of said preamble; and
said one or more circuits enable sending of each of said plurality of fragment payloads to a physical layer protocol entity instance selected from said plurality of physical layer protocol entity instances.

25. The system according to claim 24, wherein said one or more circuits enable transmission of said plurality of fragment payloads via a plurality of physical links corresponding to at least a portion of said plurality of physical layer protocol entity instances.

26. The system according to claim 25, wherein said plurality of physical links is associated with a single logical link.

27. The system according to claim 24, wherein said one or more circuits enable generation of a fragment header corresponding to each of said plurality of fragment payloads.

28. The system according to claim 27, wherein said one or more circuits enable generation of a sequence number within each said generated fragment header.

29. The system according to claim 27, wherein said one or more circuits enable generation of an indication within said generated fragment header when said each of said plurality of fragment payloads comprises a first fragment from said each of said received data packets.

30. The system according to claim 27, wherein said one or more circuits enable generation of an indication within said generated fragment header when said each of said plurality of fragment payloads comprises a last fragment from said each of said received data packets.

31. The system according to claim 27, wherein said one or more circuits enable generation of an error check field based on said generated fragment header.

32. The system according to claim 31, wherein said one or more circuits enable generation of a fragment by combining said generated fragment header, said generated error check field and said corresponding each of said plurality of fragment payloads.

33. The system according to claim 32, wherein said one or more circuits enable encapsulation of said each of said plurality of fragment payloads in a corresponding said fragment when sending said each of said plurality of fragment payloads to said physical layer protocol instance.

* * * * *